United States Patent [19]

Murphy et al.

[11] Patent Number: 5,725,898
[45] Date of Patent: Mar. 10, 1998

[54] METHOD OF MAKING DENSIFIED FLOWABLE ROASTED AND GROUND COFFEE

[75] Inventors: Sean Mackay Murphy, Longmeadow, Mass.; Helmut Sieling; Gerald Sigmund Wasserman, both of Bremen, Germany

[73] Assignee: Kraft Foods, Inc., Northfield, Ill.

[21] Appl. No.: 639,048

[22] Filed: Apr. 24, 1996

[51] Int. Cl.$^6$ .............................. A23F 5/00; A23F 5/08; A23F 5/12
[52] U.S. Cl. .................... 426/443; 426/453; 426/454; 426/516; 426/518; 426/595
[58] Field of Search .................... 426/443, 595, 426/454, 516, 518, 453

[56] References Cited

U.S. PATENT DOCUMENTS

| | | |
|---|---|---|
| 1,903,362 | 4/1933 | McKinnis . |
| 2,053,106 | 9/1936 | Piacentini . |
| 2,118,010 | 5/1938 | Hazle, Jr. . |
| 2,517,073 | 8/1950 | Alvarez . |
| 2,931,727 | 4/1960 | Kraut . |
| 2,931,728 | 4/1960 | Franck et al. . |
| 3,459,558 | 8/1969 | Farmer et al. . |
| 3,511,666 | 5/1970 | Hudson et al. . |
| 3,660,106 | 5/1972 | McSwiggin et al. . |
| 3,762,930 | 10/1973 | Mahlmann . |
| 3,801,716 | 4/1974 | Mahlmann et al. . |
| 4,267,200 | 5/1981 | Klien et al. . |
| 4,331,696 | 5/1982 | Bruce, III . |
| 4,591,508 | 5/1986 | Pultinas, Jr. . |
| 4,602,558 | 7/1986 | Kaper et al. . |
| 4,637,935 | 1/1987 | Kirkpatrick et al. . |
| 5,227,188 | 7/1993 | Leppla et al. . |

FOREIGN PATENT DOCUMENTS

| | | | |
|---|---|---|---|
| 1015206 | 8/1977 | Canada | 426/595 |
| WO95/02334 | 1/1995 | WIPO . | |

OTHER PUBLICATIONS

Sivetz et al., *Coffee Technology*, AVI Publishing Co., Inc., Westport, Connecticut, 1979, pp. 265-278 and 527-538.

*Primary Examiner*—Anthony J. Weier
*Attorney, Agent, or Firm*—Thomas A. Marcoux; Thomas R. Savoie

[57] ABSTRACT

A flowable roasted and ground coffee product is provided having a median volumetric ("X50") particle size of from 270 to 1100 μm, a density of from 0.5 to 0.7 gm/cc and 30-41% by weight of which extracts when brewed. The product is in the form of aggregates of granular roasted and ground coffee particles having a maximum X50 particle size of 270 μm and is produced by forcing roasted and ground or roasted whole bean coffee through an orifice under conditions of pressure and shear sufficient to grind the coffee and to form the coffee into a dense mass of roasted coffee made up of the granular roasted and ground coffee particles tightly bonded together. The dense mass of roasted coffee is then reground to produce the roasted and ground coffee product which is in the form of aggregates having an X50 particle size in the range of 270–1100 μm, the aggregates being made up of the granular coffee particles.

9 Claims, 1 Drawing Sheet

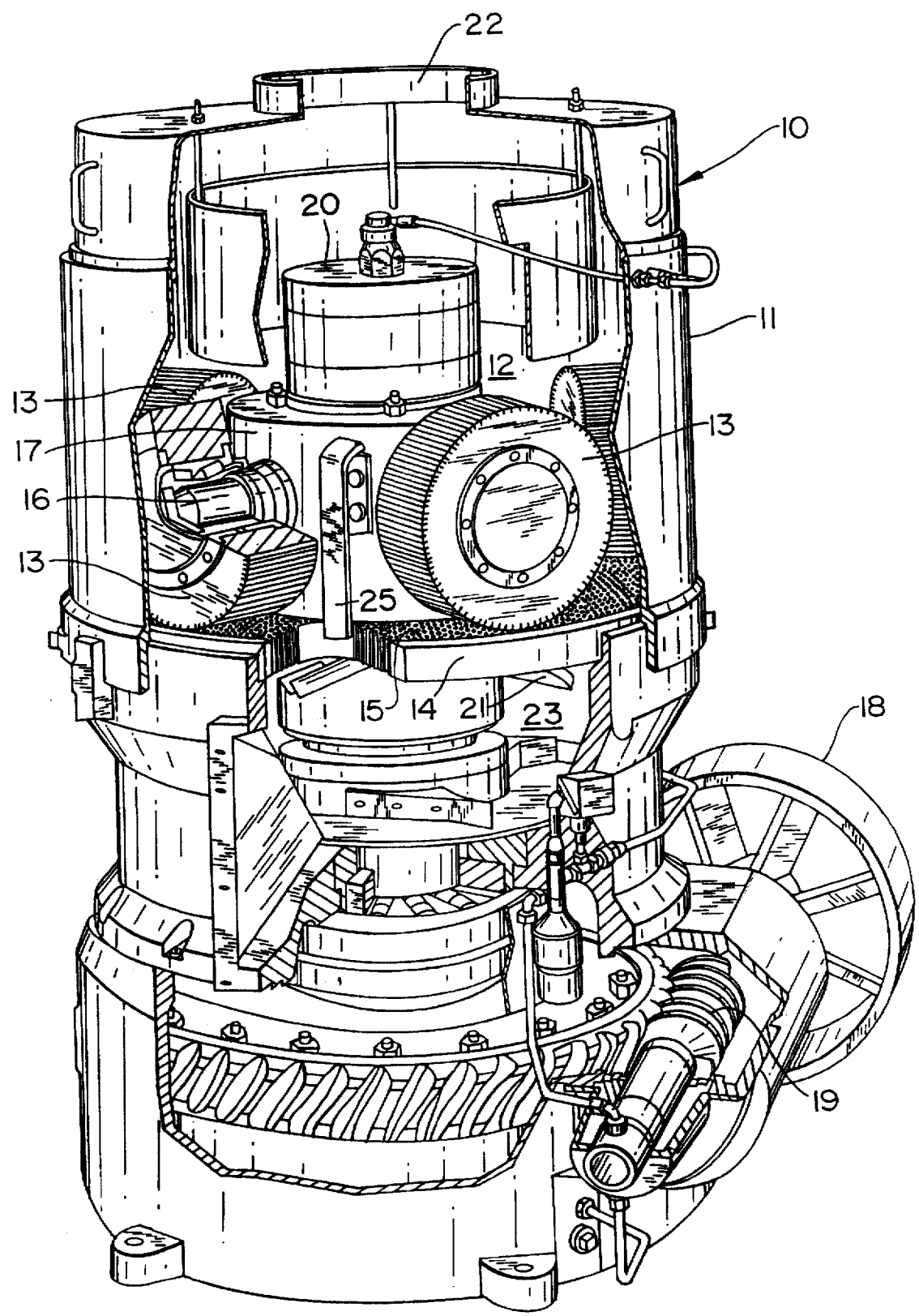

METHOD OF MAKING DENSIFIED FLOWABLE ROASTED AND GROUND COFFEE

FIELD OF THE INVENTION

The invention relates to a roasted and ground coffee products having a density higher than conventional roasted and ground coffee, and to methods of making the coffee products.

BACKGROUND OF THE INVENTION

Roasted and ground coffee has been widely sold for many years in the United States and other countries in a "one pound" size can which holds 1,000 cc of the coffee and which yields about 85 cups of coffee. A 1,000 cc quantity of roasted and ground coffee made by grinding coffee beans which have been roasted by a conventional slow roasting process weighs about 16 ounces. In more recent years fast roasting conditions have been employed to increase brew yield. Fast roasting conditions which cause an increase in brew yield have the additional effect of reducing the density of the roasted and ground coffee. The increase in brew yield makes it possible to obtain the same number of cups of coffee from a lower weight of coffee beans, thus providing a potential cost savings both to the manufacturer and the consumer. The decrease in density makes it possible to obtain the same, or approximately the same, number of cups of coffee from a given volume of coffee. This makes it convenient for the consumer to use the newer, less dense coffee since the volume of coffee employed by the consumer in brewing is essentially the same as the consumer had used in brewing conventional, slow roasted coffee. The density of conventional roasted and ground coffee products is often adjusted during the grinding process by a normalizer such that 1,000 cc of the roasted and ground coffee will fit in the conventional "one pound" coffee can. Currently in the United States, the most widely sold coffee is fast roasted and 1,000 cc of the coffee weighs 13 ounces. Such coffee has a bulk density of about 0.37 gm/cc. This coffee continues to be sold in the conventional "one pound" (i.e., 1,000 cc) can which continues to provide about 85 cups of coffee because of the increased brew yield.

While the standard roasted and ground product currently sold in the United States has a bulk density of about 0.37 gm/cc, the bulk density of free flowing roasted and ground coffee can vary quite widely, depending on features such as bean type, roasting conditions, and grinding. In general, bulk density of free flowing roasted and ground coffee is in the range of 0.30 to 0.50. Sivetz, M. et al., *Coffee Technology*, Avi Publishing Company, Inc., Westport, Conn. (1979) at pages 528–529 gives the following bulk density values:

| Grind | Density (gm/cc) |
|---|---|
| Coarse | 0.30 |
| Regular | 0.37 |
| Fine | 0.38–0.40 |

As mentioned above, the density of roasted and ground coffee is routinely increased by mixing or homogenizing equipment such as a Gump Normalizer (Modern Processing Equipment, Inc., Chicago, Ill.). Kirkpatrick et al., U.S. Pat. No. 4,637,935, states that the purpose of a normalizer is to increase the density of coffee to fit into the appropriate container. Hazle, U.S. Pat. No. 2,118,010 (assigned to the B. F. Gump Co.) relates to a device which first cracks and granulates roasted coffee beans and then subjects the mass to agitation. Hazle notes that one of the advantages of the system is that the product density is increased so that a given weight of coffee can be packaged in a smaller package. It has also been recognized that if the density of the roasted and ground coffee were increased to the extent that the consumer would use substantially less volume of coffee than customary, such products might not be readily accepted by the consumer. See, for example, Pultinas, U.S. Pat. No. 4,591,508 and McSwiggin et al., U.S. Pat. No. 3,660,106. Another concern with an increase in the density of roasted and ground coffee is its flowability. Simple compression of coffee, for example, will cause an increase in density. However, compression which will achieve a substantial increase in density will result in a product which is not free flowing. In an extreme case, the product will be a solid mass such as in Hudson et al., U.S. Pat. No. 3,511,666.

Several flowable densified roasted and ground coffee product and methods of making the same have been previously described. Leppla et al., U.S. Pat. No. 5,227,188 describes a flowable densified roasted and ground coffee product which is made by mixing coffee granules and coffee non-granules of particular particle sizes and in a particular ratio followed by densifying the mixture in a conventional Gump normalizer. The granules, which make up at least 40% by weight of the product, have an average particle diameter of from 600–3,000 µm. The tamped density of the product is reported as being from 0.41 to 0.55 gm/cc, and brew cup yield is reported as being in the range of 120 to 200 cups per 1,000 cc dry volume of the densified product.

Mahlman et al., U.S. Pat. No. 3,801,716 describes a method in which roasted coffee beans are selectively subjected to either a one or two stage comminution process, a higher grade coffee fraction being comminuted via a single grinding operation and a lower grade coffee fraction being comminuted first by a compression operation and then by a second subdivision (e.g., grinding) operation. The two comminuted fractions may then be combined to produce a roasted and ground coffee product having increased extractability and modified flavor and/or aroma. The lower grade fraction is prepared by subjecting whole roasted beans to a pressure of 1,500–13,000 psi in a compaction mill or press, which is capable of breaking up the coffee beans by the application of pressure, followed by gentle comminution, such as in a granulator, to produce a flowable roasted and ground coffee product having an increased brew yield and having a density of from about 0.39–0.52. The product preferably has a particle size of 4–10 mesh U.S. Standard screen size but may also be the same size (about 18 mesh) as conventional roasted and ground coffee. We have found, by analysis of spent grounds after brewing, that Mahlman's flowable roasted and ground product is made up of generally large size particles, typically having an average particle size of over 900 µm.

Several U.S. patents describe flowable flaked coffee products which are made by pressing roasted and ground coffee to provide coffee flakes. Normally, each flake is made from one coffee particle. Klien et al., U.S. Pat. No. 4,267,200 describes a process wherein aggregate coffee flake particles are prepared which comprise a plurality of compressed coffee flakes bonded together. The density of coffee flakes is generally not higher than about 0.50 gm/cc. U.S. Pat. No. 5,227,188 reports that the density of flaked coffee having a density of 0.4 gm/cc can be increased to 0.465 gm/cc in 20 seconds in a conventional Gump normalizer. The patent also reports that density of the flakes can be further increased to about 0.6 gm/cc in 4–8 minutes.

Mahlman, U.S. Pat. No. 3,762,930 describes a roasted and ground product made by mechanical pressure roasting of green coffee. Pressure roasting is reported to result in a bulk density increase of from about 0.005 gm/cc to about 0.027 gm/cc. Maximum bulk density reported for the mechanical pressure roasted product is 0.372.

Hudson, U.S. Pat. No. 3,511,666 describes a non-flowable compressed coffee wafer or pellet which is enclosed within a porous container, the container being much like a "tea bag". The product is made by degassing and compressing roasted and ground coffee under a pressure of 8,000–16,000 psi. A suitable particle size of the starting material is about 85% between 12 and 30 mesh U.S. Standard screen size and about 15% less than 30 mesh. Piacenti, U.S. Pat. No. 2,053,106 discloses a coffee tablet prepared by first compounding roasted and ground coffee with a sugar solution followed by drying, grinding, and pressing into tablet form.

Kaper et al., U.S. Pat. No. 4,602,558 relates to an apparatus for making a consumption unit of coffee in which roasted and ground coffee is pressed into a compact mass under a pressure of about 15,000 psi which is said to cause about 90% of the cells in the coffee to be broken. The compact mass is disintegrated when it is discharged from the press by a plunger.

Kraut, U.S. Pat. No. 2,931,727, describes a process of pelletizing of a roasted and ground fine coffee fraction (i.e., passing through a #24 U.S. Standard mesh screen). The pellets are then distributed throughout a coarse fraction of roasted and ground coffee. This effectively immobilizes the fines in the form of pellets and thus prevents pressure drop problems that would occur in pressure percolation if the fines were not in the form of pellets. Franck et al., U.S. Pat. No. 2,931,728 describes a process in which coffee expeller cake (or coffee meal) is pelletized. The pellets are then distributed throughout roasted and ground coffee prior to percolation, similarly as in the Kraut patent. This enables the coffee meal, which is virtually impossible to percolate by itself, to be percolated.

Wong et al., WO 95/02334, discloses the compacting of fine coffee particles having particle diameters of less than 600 µm to a bulk density of 0.4 to 0.7 gm/cc. Compaction is effected without substantially distorting the cells walls within the particle. The resulting particles are said to fit more efficiently among themselves and among other coffee particles while also maintaining flowability.

BRIEF SUMMARY OF THE INVENTION

It is an object of the invention to provide flowable densified roasted and ground coffee products having a density which is substantially higher than that of conventional roasted and ground coffee and which has a brew yield which is at least equal to that of the coffee from which it is prepared.

It is a further object of the invention to provide such densified coffee products which have a bulk density of at least 0.5 g/cc, preferably at least 0.55 g/cc.

It is a further object of the invention to provide such products having the appearance of conventional roasted and ground coffee but which are aggregates of granular particles of roasted and ground coffee.

It is a further object of the invention to provide methods of preparing such products.

BRIEF SUMMARY OF THE INVENTION

The foregoing and other objects which will be readily apparent to those having ordinary skill in the art are achieved by the present invention by providing a flowable roasted and ground coffee product having a median volumetric (or "X50") particle size of from 270 to 1100 µm, a density of from 0.5 to 0.7 g/cc and 33–41% by weight of which extracts when brewed, said product being in the form of aggregates of granular roasted and ground coffee particles having a maximum X50 particle size of 270 µm and by providing a method for producing the flowable roasted and ground coffee product, the method comprising providing roasted coffee selected from the group consisting of roasted and ground coffee having an X50 particle size of at least 250 µm and roasted whole coffee beans; forcing said roasted coffee through an orifice under conditions of pressure and shear sufficient to grind the coffee and to form the coffee into a dense mass of roasted coffee having a density of about 0.8 to 1.1 g/cc, said mass being made up of granular roasted and ground coffee particles tightly bonded together, said granular coffee particles having a maximum X50 particle size of 270 µm; and regrinding the dense mass of roasted coffee to produce said roasted and ground coffee product, said product being in the form of aggregates of said granular coffee particles.

DESCRIPTION OF PREFERRED EMBODIMENTS

The drawing is a perspective view, with portions broken away, of apparatus suitable for carrying out the pelletizing step of the present invention.

The median volumetric (or "X50") particle size used for these characterizations is defined as the point on a plot of the cumulative volume percent curve such that in a given sample the total particle volume of the particles smaller than this size would be equal to the particle volume of the particles larger than this size. If all particles in the sample had the same density, a sieve with an opening of exactly this size would allow 50% of the weight of the sample to pass through and would thus retain 50% of the weight. The X50 value is determined by a laser scattering particle size analyzer which estimates the actual percentage of particles in 32 size bands. The smallest band is generally 0–18 µm and the largest is generally 2940–3500 µm. This procedure yields results theoretically the same as what one would obtain if one used 32 sieves ranging in opening from 18 to 2940 microns and one were to calculate the weight average particle size by multiplying the average size within each band by the weight on each sieve and dividing by the total sample weight.

Measurement of the particle size of conventional roast and ground coffee used as feed or for comparative brew yield evaluation, and measurement of the particle size of pelletized roast coffee, after the comminution step required to produce an appearance similar to roast and ground from pellets, is conducted in a dry powder state using the laser scattering particle size analyzer.

Measurement of the particle size of the roast and ground coffee particles which make up the actual pellet aggregates or ground pellet aggregates is conducted by dispersing the pellets in boiling water. The X50 particle size of these spent grounds is then measured in a water dispersion via the same laser scattering particle size analyzer equipped with a flowthrough cell. This procedure is required for the aggregate material as any mechanical action to break up the aggregates would entail the creation of additional finer particles and thus give a falsely smaller particle size. Similarly, drying the spent grounds and then attempting to measure the particle size in a dry state, would give a falsely higher particle size due to the tendency of the spent grounds to fuse together and form a dry cake.

Particle size of spent grounds from conventionally ground roast coffee can also be measured as a wet dispersion in this manner. In this case a direct comparison of the size of the spent grounds to the starting dry roast and ground shows that the spent grounds have swelled less than about 5%.

Unless otherwise stated, percentages given herein are percentages by weight and density is bulk density.

Bulk density is determined by placing approximately 250 ml of coffee in a 250 ml graduated cylinder, weighing the coffee, tapping the cylinder 87 times in 19 seconds in a Stampf Volumeter Model JEL STAV 2003 (J. Englesmann, Ludwigshafen, Germany) and recording the final volume. Bulk density is calculated by dividing the grams of coffee by final volume.

Brew yield is determined by weighing the desired amount of coffee into a drip brewer filter paper, brewing a full pot as recommended by the drip brewer manufacturer, weighing the amount of brew recovered in the brewer carafe, measuring the brew solids of a subsample with a Paar densitometer (Chempro/Paar Type 46, Anton Paar K. G., Graz, Austria) calibrated to measure % solids as a function of density.

Brew yield is calculated by the following formula:

$$\% \text{ brew yield} = \frac{(\% \text{ solids}) (\text{brew weight})}{(\text{initial coffee weight})}$$

Calibration is based upon brew solids of similar brews.

Particle size is determined by a Sympatec Helos Model No. 19032 laser particle size analyzer (Sympatec GmbH, Clausthal-Zellerfeld, Germany) equipped with a Rodos dry particle feeder for dry particle size measurements or equipped with a Sucell for measurements of particles dispersed in water (i.e., spent grounds). The dry particle analysis requires only that a representative sample be introduced to the Rodos feeder. Duplicate analyses are conducted to confirm accuracy. The unit calculates the size of several thousand particles. For spent grounds analysis, 10 gm of pellets or ground pellets are dispersed in 150 ml of boiling water and the sample is placed in the Sucell feed hopper. Approximately 10 ml of the dispersion is then pumped through the cell and the size of the particle is calculated. The Eelos system calculates the full distribution by counting the number of particles in 32 size bands and reports the median volumetric particle size as X50. The focal length of the lens used is 2000 mm and the size of the largest particles measured is 3500 μm.

Roast color of the coffee is measured by presenting a ground coffee sample to a Lange reflectance color unit (Model No. LK 100, Bruno Lange, Berlin, Germany). The scale used for reporting can be described in traditional terms as giving approximately the following values:

| | |
|---|---|
| light roast | 15–20 |
| medium roast | 11–15 |
| dark roast | 8–11 |
| espresso roast | 5–8 |

The initial roasted coffee which is pelletized is preferably ground prior to pelletizing but may be roasted whole beans. Roasted and ground coffee for pelletizing suitably has an average particle size of 250–1100 μm, preferably 300–800 μm, and more preferably 350–600 μm.

All coffee types, such as Arabicas, Brazils, Robustas, etc. are suitable. Grinding can be effected in any convenient way, including conventional grinding equipment used in making commercial roasted and ground coffee.

In accordance with the invention, the dense coffee mass is formed by subjecting roasted coffee to grinding between a grinding roll and a die member while simultaneously forcing the coffee as it is being ground through a plurality of die orifices in the die member. The grinding roll is urged under pressure towards the die member and is caused to move across a surface of the die member either by moving the grinding roll relative to the die surface or by moving the die surface relative to the grinding roll, or both. The grinding roll may be either free-wheeling or driven. Where the grinding roll is driven, its rotation is preferably adjustable to enable adjustment of the amount of shearing induced as the grinding roll traverses the die member, similarly as in adjusting the relative speeds of opposed grinding or flaking rolls. Similarly, where the die member is moved relative to the grinding roll, its speed is also preferably adjustable, for adjustment of shear.

The die member has a plurality of orifices or canals through which the coffee being ground is passed. The orifices are provided in the active surface of the die member, that is the surface which is traversed by the grinding roll. Orifices having a cross sectional area of about 0.75 to 29 $mm^2$ are suitable. It is preferred that the orifices are circular in cross section and all of the same size and shape. The diameter of circular orifices is preferably from 1 to 6 mm. The cross sectional size of the pellets is essentially the same as the cross sectional size of the die orifice. Thus, cylindrical pellets preferably have a diameter of 1–6 mm. It is also preferred that the orifices constitute from 10 to 50% of the active surface of the die member. The orifices extend through the die member and thus are in the form of elongate canals. The orifice canals are preferably chamfered at the inlet (i.e., at the active surface of the die member) but may be uniform in cross section along their length and/or may be chamfered at the outlet ends. As the coffee is forced through the die orifices, it is preferably periodically cut to provide discrete compacted particles or pellets of convenient size, suitably from 1.5 to 3.0 cm in length.

In preferred apparatus, the die member is a horizontally oriented disc with an upwardly disposed horizontal annular active surface. A plurality of grinding rolls are mounted for movement relative to the die member such that each grinding roll, which may be free-wheeling or driven, is caused to roll along a path defined by the active surface of the die member as the grinding roll is being urged downwardly under pressure against the die member. The die member constitutes the bottom of a chamber which houses the grinding rolls. Roasted coffee is continuously introduced into the chamber where it is subjected to grinding and is also forced through the die orifices as described above. A knife member is preferably provided to sweep along the outlet (lower) side of the die member to sever the pelletized material into convenient length.

A preferred device is a Kahl pellet mill (available from LCI Corporation, Process Division, Charlotte, N.C.) which is currently available in various sizes up to a nominal rated capacity of 35 tons of pellets per hour. These machines have been used in the past to pelletize such products as waste plastic, animal feed, hops and beet pulp.

The foregoing type of pellet mill is illustrated in the drawing. The mill 10 has a housing 11 enclosing a vertically oriented cylindrical upper chamber 12 in which a plurality of grinding rollers 13 are mounted. The outer surfaces of grinding rollers 13 may be smooth, but are preferably grooved as shown, with the grooves oriented at an angle, preferably 90°, to the direction of roller rotation. The bottom of chamber 12 is defined by die member 14 having an annular upper active surface 15 having a plurality of cylindrical through holes, each constituting an individual die orifice for forming a densified coffee pellet. Rollers 13 are each mounted on a roller bearing 16 for rotating about an axis which extends horizontally and radially outwardly from a member 17 which is mounted for rotation in chamber 12 about the vertical cylindrical axis of chamber 12 by means of a drive wheel 18 and associated gearing 19. Member 17 is also mounted for vertical positioning by hydraulic system 20 to adjust the gap between the bottom of each roller 13 and the active upper surface of die member 14 to thereby adjust the pressure exerted by rollers 13 on roasted coffee that is in the gap. A rotatable knife 21 is mounted adjacent the lower (i.e., pellet outlet) surface of die member 13 and is positioned to sweep across that surface to cut the pelleted material into desired length. The number of knife blades and their rotation speed will determine the length of the pellets.

In use, roasted coffee is fed into a feed inlet 22. Member 17 is rotated about its vertical axis causing the roasted coffee to be subjected to grinding between grinding rolls 13 and die member 14. As the coffee is being ground, it is also forced into and through the die orifices in die member 14. The grinding rolls are caused to move across upper surface 15 of die member by rotation of member 17, thus subjecting the roasted coffee lying in the nip region between the rolls and surface 15 to considerable grinding pressure and shear. If rolls 13 are free wheeling and not driven, the coffee is primarily subjected to pressure in the nip region. However, rollers 13 may be driven about their horizontal axes and the speed and/or direction of rotation is preferably adjustable to create a differential velocity between the roller surface as it rolls across die member surface 15, thus subjecting the coffee in the nip region to shear, the amount of which can be widely varied by adjustment of the velocity difference. Similarly, the distance between the grinding rolls and the active die surface is adjusted to provide either more pressure and shear (narrower distance) or less pressure and shear (wider distance).

The cut pellets fall by gravity from lower chamber 23 and are discharged through an outlet port not shown. Rotating member 24 is normally provided to facilitate product discharge and one or more scraper members 25 may be provided in chamber 12 to direct coffee into the nip region.

It is preferred to conduct pelletizing at coffee temperatures which do not exceed 100° C. and which preferably do not exceed 75° C. Pelletizing will create heat, and excessive coffee temperature can be controlled by cooling the roasted coffee feed material prior to pelletizing, and/or by cooling the pelletizer, particularly the grinding rolls and/or the die member, and/or by controlling the rate of pelletizing. It is a distinct advantage of the invention that roasted coffee beans can be fed directly to the pelletizing process with little or no pre-cooling.

Moisture content of the coffee being pelletized is preferably in the range of about 2-10% by weight.

The pellets are then ground to produce a densified roasted and ground coffee product having an X50 particle size of 270-1100 µm and having the general appearance of roasted and ground coffee. A preferred X50 particle size of the product is 400-850 µm. At the same recipe, coffee beverages prepared by brewing the re-ground densified product give a somewhat stronger coffee taste when compared to brews prepared from the roast coffee starting material.

The bulk density of the re-ground product is at least 0.50 gm/cc and up to 0.70 gm/cc and preferably in the range of 0.55 to 0.70 gm/cc.

Brew yield is in the range of 30 to 41%, preferably 33% to 41%, is at least comparable to that of the roasted feed material, and is preferably increased by at least 10% relative to the roasted and ground feed material. Where the roasted feed material is roasted whole beans, brew yield comparison is made to roasted and ground coffee made by grinding the roasted whole beans to an X50 particle size of about 450 µm.

The re-ground, densified product, on brewing, yields granular spent grounds that are considerably smaller than the re-ground densified product. Thus, the densified product particles are agglomerates of the smaller granular products. The X50 particle size of the fine granular particles that make up the densified agglomerate particles is not greater than 270 µm, preferably not greater than 175 µm, and more preferably within the range of 50 to 175 µm.

As mentioned above, the re-ground densified product has the general appearance of conventional roast and ground coffee. Accordingly, the product can be utilized in the same type of coffee products in which conventional roast and ground coffee is utilized. For example, the re-ground densified product can be used directly in conventional commercial or home brewing devices. The product can be blended with other coffee products including conventional roast and ground coffee. For example, the product can be blended with a less dense roasted and ground coffee to increase its density. The amount of the dense product to be included for this purpose would depend on the desired increase in density. In general, at least 10% by weight, based on the weight of the blend, would be utilized to achieve a significant increase in product density.

Conventional additives for roast and ground coffee products may be included with the densified coffee product. For example, soluble coffee, suitably in an amount ranging from 10 to 35% by weight based on the weight of the blend, can be added.

The densified coffee product can be packaged in conventional coffee packages except that for a given package size, the weight and the number of cups of coffee obtainable from the densified coffee product would be correspondingly greater than for conventional, less dense, roast and ground coffee.

EXAMPLE I

Pelletizing of 460 µm RaG

A fast (90 second) roasted and ground coffee having an X50 particle size of 460 µm is prepared by blending and grinding the following three separately roasted coffee bean fractions:

| Fraction | Type | Roast Color (°Lange) | Amount of Fraction in Blend (%) |
|---|---|---|---|
| A | Colombians | 8.5 | 50 |
| B | Brazils | 10 | 30 |
| C | Robustas | 16 | 20 |

The mixed beans are allowed to equilibrate for at least two hours at ambient conditions. The beans are ground on a Probat Grinder UW 2011, a two roll grinder with normalizer attachment. The settings used were 1.0 mm for the forebreaker, and a setting of 50 for the fine cutting roll. The densifier was set on 0/80 at a product throughput rate which gave minimal densification (less than 5% increase).

The beans are ground to an X50 particle size of 460 µm as determined by Helos analysis. The resulting bulk density of the roasted and ground product is 0.308 gm/cc.

The resulting roasted and ground product is allowed to degas for a period of at least one hour prior to pelletization. The roasted and ground blend has a roast color of 10.3° Lange, a moisture content of 4.9% and a brew yield of 36%.

The degassed 460 µm grind of the mixture is then fed into an Amandus Kahl L175 Laboratory pellet press. The press is fitted with a circular die matrix. The roasted and ground feed material is pressed through the die matrix via two rollers traveling at 100 RPM around the circumference of the die matrix. The current required for this operation is 6.0 Amps, compared to 3.5 Amps, the power required for the running of an empty machine. Two runs are carried out, each with a different die orifice diameter and pressway ratio. Pressway ratio is defined as the ratio of the inside diameter of the narrowest portion of the die orifice to the length of the narrowest portion. Lower pressway ratios tend to subject the coffee to higher pressure and to create more heat. Pressway ratios of about 1:7 to 1:3 are preferred for the preferred circular orifice diameters of 1–6 mm.

The pellets are allowed to cool in a quiescent state for at least 15 minutes prior to grinding. The pellets are then ground on a Probat benchtop dual roll mill with the following settings: 1.3 mm for the pre-breaker and 0.8 mm for the fine-breaker. The particle size of the resultant re-ground product of run 1–2 is determined by Sympatec laser scattering analysis. Results are reported in Table 1A.

TABLE 1A

| | Pelletizing | | | | Re-ground Product X50 | | | |
|---|---|---|---|---|---|---|---|---|
| Run No. | Orifice Size (mm) | Pressway Ratio | Flow Rate (Kg/hr) | Pellet Temp. (°C.) | Particle Size (µm) | Moisture (%) | Density (gm/cc) | Density Increase (%) |
| 1-1 | 4 | 1:5 | 63 | 69 | 515 | 3.7 | .627 | 51 |
| 1-2 | 2 | 1:4 | 53 | 85 | 616 | 3.9 | .623 | 51 |

The re-ground coffee is brewed in a Mr. Coffee Accel-Brewer at a recipe level of 1460 ml water/21.7 grams of coffee which corresponds to 85 cups per 7.9 oz. can. Results are reported in Table 1B.

TABLE 1B

| Run No. | Brew Yield (%) | Brew Yield Increase (%) | Spent Grounds Analysis X50 (µm) |
|---|---|---|---|
| 1-1 | 39 | 5 | <150 µm* |
| 1-2 | 41 | 10 | 75 |

*Estimated

It will be seen that the roasted and re-ground product has an average particle size typical of conventional roasted and ground coffee but that its brew yield has been substantially increased relative to the starting roasted and ground coffee, while its density is doubled.

EXAMPLE II

Pelletizing of 940 µm R & G

A roasted and ground coffee having an average particle size of 940 µm is prepared by blending and grinding the same three fractions of coffee beans separately roasted as in Example I. The blend has a roast color of 8.8° Lange, a density of 0.34, a moisture content of 4.8%, and a brew yield of 29%. A portion of the roasted and ground starting material is cooled to 0° C. and pelletized in the same manner as in Example I, and the pellets are then gently ground. Conditions and results are reported in Table 2A.

TABLE 2A

| | Pelletizing | | | | Re-ground Product Average | | | |
|---|---|---|---|---|---|---|---|---|
| Run No. | Orifice Size (mm) | Pressway Ratio | Flow Rate (Kg/hr) | Pellet Temp. (°C.) | Particle Size (µm) | Moisture (%) | Density (gm/cc) | Density Increase (%) |
| 2-1 | 2 | 1:4 | 43 | 93 | 706 | 2.7 | .627 | 84 |
| 2-2 | 4 | 1:5 | 55 | 67 | 800 | 3.7 | .621 | 83 |

Coffee beverages are brewed, and results are reported in Table 2B.

TABLE 2B

| Run No. | Brew Yield (%) | Brew Yield Increase (%) | Spent Grounds Analysis X50 (µm) |
|---|---|---|---|
| 2-1 | 41 | 40 | <150* |
| 2-2 | 39 | 33 | <150* |

*Estimated

As in Example I, density of the product is about twice that of the starting material. The increase in brew yield is substantially greater than the increase shown in Example I due in part to the relatively more coarse (940 µm average particle size) nature of the starting material in Example II and the somewhat smaller average particle size of the ground pelletized product of Example II (706 µm and 800 µm) relative to the starting material. In Example I, the particle size of the starting material is relatively fine (460 µm) and the ground pelletized product is larger.

EXAMPLE III

Pelletizing of 1200 µm R & G

A roasted and ground coffee having an X50 particle size of about 1200 µm is prepared by roasting a 2.0 kg charge of Colombian coffee on a Neotec RFB-6 roaster for 250 seconds with an air temperature of 297° C. The roast coffee has a ground moisture value of 5%, a color value of 12° Lange, a bulk density of 0.314 gm/cc, and a brew yield of 25% (or 0.39% soluble solids). A portion of the roasted and ground starting material is cooled to 0° C., and pelletized in the same manner as in Example I, and the pellets are then gently ground. Conditions and results are reported in Table 3A.

TABLE 3A

| Pelletizing | | | | Re-ground Product | | | |
|---|---|---|---|---|---|---|---|
| Orifice Size (mm) | Pressway Ratio | Flow Rate (Kg/hr) | Pellet Temp. (°C.) | Average Particle Size (µm) | Moisture (%) | Density (gm/cc) | Density Increase (%) |
| 2 | 1:3 | 47.5 | 70 | 708 | 2.7 | 0.572 | 82 |

Coffee beverages are brewed, and results are reported in Table 3B.

TABLE 3B

| Brew Yield (%) | Brew Yield Increase (%) | Spent Grounds Analysis X50 (μm) |
| --- | --- | --- |
| 34 | 34 | 246 |

As in Example I, density of the product is about twice that of the starting material. The increase in brew yield is substantially greater than the increase shown in Example I due in part to the relatively more coarse (1200 μm average particle size) nature of the starting material in Example III and the somewhat smaller average particle size of the ground pelletized product of Example III (708 μm) relative to the starting material. In Example I, the particle size of the starting material is relatively fine (460 μm) and the ground pelletized product is larger.

EXAMPLE IV

Pelletizing of Roasted Whole Beans

First and second portions (runs 3-1 and 3-2) of Colombian beans are roasted and a sample of each portion is ground. Conditions and results are reported in Table 4A.

TABLE 4A

| | | Roasted and Ground | | | |
| --- | --- | --- | --- | --- | --- |
| Run No. | Beans Roast/Color °Lange | X50 Particle Size (μm) | Moisture (%) | Density (gm/cc) | Brew Yield (%) |
| 4-1 | 42.7 | 430 | 4.5 | 0.33 | 31 |
| 4-2 | 13.4 | 430 | 4.5 | 0.33 | 31 |

A further sample of each portion of the roasted beans is pelletized as in Example I except that the beans are at ambient temperature (21.5° C. in Run 1 and 30.8° C. in Run 2) upon entering the Kahl pelletizer. The pellets are then gently ground as in Example I. Conditions and results are reported in Table 4B.

TABLE 4B

| | Pelletizing | | | | | | Re-ground Product | |
| --- | --- | --- | --- | --- | --- | --- | --- | --- |
| Run No. | Orifice Size (mm) | Press-way Ratio | Rate (Kg/hr) | Pellet Temp. (°C.) | Average Particle Size (μm) | Mois-ture (%) | Density (gm/cc) | Density Increase (%) |
| 4-1 | 2 | 1:4.5 | 54 | 83 | 790 | 2.85 | 0.59 | 79 |
| 4-2 | 6 | 1:5 | 75* | 68 | 586 | 3.73 | 0.61 | 85 |

*Estimated

Coffee beverages are brewed, and brew yield and spent ground particle size are determined, all as in Example I. Results are reported in Table 4C.

TABLE 4C

| Run Number | Brew Yield (%) | Brew Yield Increase (%) | Spent Grounds Analysis X50 (μm) |
| --- | --- | --- | --- |
| 4-1 | 32 | 4 | 261 |
| 4-2 | 34 | 10 | 95 |

EXAMPLE V

Pelletizing of Warm Roasted Whole Beans

The general procedure of Run 2 of Example III is followed except that the beans fed to the pelletizer are at an elevated temperature of about 67° C. This is achieved by cooling the roasted whole beans only partially in the roaster and feeding the roasted whole beans immediately into the Kahl pelletizer. Die orifice size is 6 mm and pressway ratio is 1:5. Other differences and results are indicated in Table 5A.

TABLE 5A

| | Control Roasted and Ground | | | | | Re-ground Product | | | | | |
| --- | --- | --- | --- | --- | --- | --- | --- | --- | --- | --- | --- |
| Beans Roast Color (°Lange) | X50 Particle Size (μm) | Moisture (%) | Density (gm/cc) | Brew Yield (%) | Pellet Temp (°C.) | X50 Particle Size (μm) | Density (gm/cc) | Density Increase (%) | Brew Yield (%) | Brew Yield Increase (%) | Spent Grounds Analysis X50(μm) |
| 13 | 430 | 4.5 | 0.33 | 29 | 78 | 916 | 0.68 | 106 | 32 | 10 | 186 |

EXAMPLE VI

Pelletizing of Different Coffee Types

Roast coffee beans of the types are ground to an X50 particle size of shown in Table 6A.

|  | Roasted Beans | | | Initial Roasted and Ground | | | | |
|---|---|---|---|---|---|---|---|---|
| Run No. | Type | Roast Color (°Lange) | Moisture (%) | Average Particle Size (μm) | Density (gm/cc) | Moisture (%) | Brew Yield (%) | Color (°Lange) |
| 6-1 | Colombian | 9.04 | 5.4 | 488 | 0.31 | 5.3 | 36 | 6 |
| 6-2 | Centrals | 9.1 | 4.3 | 477* | 0.325 | 4.2 | 32 | 8.8 |
| 6-3 | Brazilian | 9.3 | 5 | 477* | 0.315 | 5.2 | 32 | 8.8 |
| 6-4 | Robusta | 9.2 | 4.8 | 465 | 0.332 | 5.1 | 36 | 9.1 |

*Estimated

The roasted and ground coffees are then pelletized with a 2 mm die size and pressway ratio of 1:4, re-ground, and brewed following the same general procedures of Examples 1–5. Conditions and results are reported in Table 6B.

ground coffee having an average particle size of 900 μm, density of 0.35 g/cc, brew yield 25%. Portions of each fraction are pelletized following the procedures of Example I with a die size of 2 mm and a pressway ratio of 1:4.5. The

TABLE 6B

|  | Pelletizing | | | Re-ground Product | | | | | | |
|---|---|---|---|---|---|---|---|---|---|---|
| Run No. | Temp In (°C.) | Flow Rate (Kg/hr) | Pellet Temp (°C.) | Average Particle Size (μm) | Density (gm/cc) | Density Increase (%) | Brew Yield (%) | Brew Yield Increase (%) | Color (°Lange) | Spent Grounds Analysis |
| 6-1 | 30 | 44.2 | 83 | 585 | .583 | 88 | 41 | 14 | 7.4 | 63 |
| 6-2 | 30 | 48.2 | 88 | 500* | .584 | 80 | 38 | 16 | 8.1 | <150* |
| 6-3 | 30 | 50.9 | 84 | 500* | .578 | 83 | 36 | 10 | 7.3 | <150* |
| 6-4 | 30 | 41.6 | 98 | 833 | .644 | 94 | 39 | 9 | 6.5 | 70 |

*Estimated

EXAMPLE VII

Pelletizing Coffee with Differing Moisture Content

A portion of the roasted and ground blended coffee of Example I having an average particle size of 460 μm, density 0.308 g/cc, and brew yield 36% (0.56) is moistened to a moisture content of 10% and then pelletized following the procedures of Example I. The pellets are re-ground and brewed following the procedures of Example I. Results are reported in Table 7.

pellets are re-ground and the re-ground pellets are blended with non-pelletized roasted and ground fractions A and B as indicated in Table 8. Brews are prepared from the initial roasted and ground coffee, from the re-ground pellets, and from the blends. Results are reported in Table 8.

TABLE 8

| Average | Density | Brew Yield |
|---|---|---|

TABLE 7

|  | Pelletizing | | Re-ground Product | | | | | | |
|---|---|---|---|---|---|---|---|---|---|
| Run No. | Die Orifice (mm) | Press- way Ratio | X50 particle Size (μm) | Mois- ture (%) | Density (gm/cc) | Density Increase (%) | Brew Yield (%) | Brew Yield Increase (%) | Spent Grounds Analysis X50(μm) |
| 7-1 | 2 | 1:4 | 712 | 8.5 | .58 | 87 | 38 | 6 | <150* |
| 7-2 | 4 | 1:5 | 839 | 8.2 | .56 | 81 | 38 | 6 | <150* |

*Estimated

EXAMPLE VIII

Mixtures of Roasted and Ground Coffee with Re-ground Pelletized Coffee

A portion of roasted Colombian beans is ground to provide a first fraction ("A") of roasted and ground coffee having an average particle size of 300 μm, density of 0.34 g/cc, brew yield 31%. A further portion of the beans is ground to provide a second fraction ("B") of roasted and

| Run No. | Com- ponent | Amount (%) | Particle Size (μm) | Re- ground (gm/cc) | Blend (gm/cc) | Re-ground Pellets (%) | Blend (%) |
|---|---|---|---|---|---|---|---|
| 8-1 | Re- ground R&G-B | 75 25 | 900 | .56 | .51 | 34 | 34 |

| | | | | | | | |
|---|---|---|---|---|---|---|---|
| 8-2 | Re-ground R&G-A | 75 25 | 300 | .58 | .51 | 34 | 34 |
| 8-3 | Re-ground R&G-B | 25 75 | 900 | .58 | .40 | 34 | 28 |

EXAMPLE IX

Flavor Analysis

Roasted and ground Robusta coffees having an average particle size of ca. 450 μm and with roast colors of 6.5°, 7.8° and 9.9° Lange and 60° PV are pelletized, and re-ground following the procedures of Example 1, Run No. 2. Results are reported in Table 9.

TABLE 9

| | Color | | Density | | | Brew Yield | | | Spent |
|---|---|---|---|---|---|---|---|---|---|
| Run No. | Starting Material (°Lange) | Re-ground Pellets (°Lange) | Starting Material (gm/cc) | Re-ground Pellets (gm/cc) | Increase (%) | Starting Material (%) | Re-ground Pellets (%) | Increase (%) | Grounds Analysis X50(μm) |
| 9-1 | 9.1 | 6.5 | .332 | .644 | 94 | 36 | 39 | 8 | 70 |
| 9-2 | 12.0 | 7.8 | .342 | .618 | 81 | 32 | 38 | 19 | <200* |
| 9-3 | 14.7 | 9.8 | .355 | .628 | 77 | 31 | 36 | 16 | <200* |

*Estimated

The pelletized and re-ground products are compared sensorically to their unpelletized roasted and ground starting materials at a recipe of 21.7 grams of coffee to 1460 ml of water. An expert panel finds significantly less earthy, dirty and musty flavor notes in the pelletized and re-ground samples than in the unpelletized roasted and ground Robusta starting materials.

COMPARISON EXAMPLE A

Comparison to Compression Granulation

In accordance with the process described in Mahlman et al., U.S. Pat. No. 3,801,716, fast-roasted Brazilian coffee at a light roast color (60photovolt) is subjected to compression granulation followed by compression at 11,000 psi in a Carver Lab Press, followed by manual granulation through a U.S. #8 mesh sieve.

A portion of the same beans are pelletized utilizing the Kahl pelletizer and following the procedures described in Example I with a 2 mm die size and a pressway ratio of 1:4. The pellets are re-ground as in Example I.

The roasted and ground compression granulation product and the re-ground pelletized product are each brewed and analyzed as in Example I to determine wet particle size of the spent coffee grounds. Results are reported in Table A.

TABLE A

| | Roasted and Ground Products | |
|---|---|---|
| Feed Material | Compression Granulation | Re-Ground Pellets |
| Pressure Used | 11,000 psi | — |
| Ground Tamped Density of Product | 0.40 gm/cc | 0.58 gm/cc |
| Brew Yield | 27 | 33 |
| Average Particle Size of Spent Grounds X50 | 934 μm | 268 μm |

What is claimed is:

1. A process for producing a flowable roasted and ground coffee product in the form of aggregates of granular roasted and ground coffee particles, said aggregates having a median volumetric particle size of from 270 to 1100 μm, a bulk density from 0.5 to 0.7 g/cc and which when brewed will have a brew yield of, from 30 to 41%, comprising:

providing roasted coffee selected from the group consisting of roasted and ground coffee having a median volumetric particle size of at least 250 μm and roasted whole beans;

forcing said roasted coffee through an orifice under conditions of pressure and shear sufficient to grind the coffee and to form the coffee into a dense mass of roasted coffee, said mass being made up of granular roasted and ground coffee particles tightly bonded together, said granular coffee particles having a maximum median volumetric particle size of 270 μm; and regrinding the dense mass of roasted coffee to produce said aggregates of roasted and ground coffee product.

2. A process according to claim 1 wherein said roasted coffee comprises roasted and ground coffee having a median volumetric particle size of at least 250 μm.

3. A process according to claim 1 wherein said roasted coffee is forced through orifices in a pellet mill and wherein said dense mass of roasted coffee is in the form of pellets.

4. A process according to claim 3 wherein said pellets are substantially cylindrical.

5. A process according to claim 4 wherein said cylindrical pellets have a diameter of 1 to 6 mm.

6. A process according to claim 1 wherein said coffee product has a median volumetric particle size of from 400–850 μm.

7. A process according to claim 1 wherein said coffee product has a bulk density of from 0.55 to 0.70 gm/cc.

8. A process according to claim 1 wherein said granular particles have a maximum median volumetric particle size of 175 μm.

9. A process according to claim 1 wherein the median volumetric particle size of said granular particles is from 50 to 175 μm.

* * * * *